US011423708B2

(12) United States Patent
Mezaael et al.

(10) Patent No.: US 11,423,708 B2
(45) Date of Patent: Aug. 23, 2022

(54) SYNCHRONIZING SENSING SYSTEMS

(71) Applicant: Ford Global Technologies, LLC, Dearborn, MI (US)

(72) Inventors: Abraham Mezaael, Southfield, MI (US); Jeffrey Scott Blair, South Lyon, MI (US); Christian Krozal, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 384 days.

(21) Appl. No.: 16/689,205

(22) Filed: Nov. 20, 2019

(65) Prior Publication Data

US 2021/0150828 A1     May 20, 2021

(51) Int. Cl.
| | | |
|---|---|---|
| *G07C 5/00* | (2006.01) | |
| *H04L 67/12* | (2022.01) | |
| *G06N 20/00* | (2019.01) | |
| *H04W 4/40* | (2018.01) | |
| *H04W 4/029* | (2018.01) | |
| *H04L 9/40* | (2022.01) | |

(52) U.S. Cl.
CPC ............ *G07C 5/008* (2013.01); *G06N 20/00* (2019.01); *H04L 63/1466* (2013.01); *H04L 67/12* (2013.01); *H04W 4/029* (2018.02); *H04W 4/40* (2018.02)

(58) Field of Classification Search
CPC ..................................................... G07C 5/008
See application file for complete search history.

(56) References Cited

U.S. PATENT DOCUMENTS

| | | | |
|---|---|---|---|
| 9,437,052 B2 * | 9/2016 | Ko .......................... | G07C 5/008 |
| 10,134,042 B1 | 11/2018 | Prasad et al. | |
| 10,593,135 B2 * | 3/2020 | Noyelle .................. | G07C 5/008 |
| 10,699,010 B2 * | 6/2020 | Subbarayan ........... | G06N 20/00 |
| 2016/0012649 A1 | 1/2016 | Ko | |
| 2017/0294059 A1 | 10/2017 | Noyelle | |
| 2021/0150828 A1 * | 5/2021 | Mezaael .............. | G07C 5/0808 |
| 2021/0312725 A1 * | 10/2021 | Milton ................... | G07C 5/008 |

FOREIGN PATENT DOCUMENTS

| | | |
|---|---|---|
| CN | 109345658 A | 2/2019 |
| WO | 2012027733 A | 3/2012 |

* cited by examiner

*Primary Examiner* — Michael A Berns
(74) *Attorney, Agent, or Firm* — Brandon Hicks; Bejin Bieneman PLC

(57) ABSTRACT

A computer includes a processor and a memory, the memory storing instructions executable by the processor to receive a first message from a vehicle specifying an event in the vehicle; identify vehicle data to confirm or disprove the event in the vehicle; identify an application programming interface (API) in the vehicle to access at least some of the vehicle data; and transmit to the vehicle a second message including a query for the vehicle data according to the API.

20 Claims, 4 Drawing Sheets

SYNCHRONIZING SENSING SYSTEMS

BACKGROUND

Data about events in a vehicle, e.g., a state or action in a component in the vehicle, may not always be accurate or complete as provided on a vehicle network. A data value such as a fault code or the like can specify that the event, e.g., a fault or other condition of a vehicle component has occurred.

DETAILED DESCRIPTION

Overview

A system comprises a computer including a processor and a memory, the memory storing instructions executable by the processor to receive a first message from a vehicle specifying an event in the vehicle; identify vehicle data to confirm or disprove the event in the vehicle; identify an application programming interface (API) in the vehicle to access at least some of the vehicle data; and transmit to the vehicle a second message including a query for the vehicle data according to the API.

The instructions can further include instructions to receive the vehicle data in response to the query and confirm or disprove the event in the vehicle based on the vehicle data. The instructions can further include instructions to confirm or disprove the event based on environmental data retrieved from a data source external to the vehicle. The data source external to the vehicle can be a stationary infrastructure element, and the environmental data can be based on infrastructure element sensor data. The instructions can further include instructions to specify an action for the vehicle based on confirming or disproving the event in the vehicle. The action can include navigating the vehicle to a specified location. The action can include disabling an operation of a vehicle component. The message can include vehicle sensor data. The message can specify a controller in the vehicle that is subject to the event. The message can include a vehicle state of charge, the instructions further including instructions to identify the API and determine the query based at least in part on the vehicle state of charge.

The API can be identified based on identifying a controller in the vehicle providing data indicating the event, and the query requests at least some of the vehicle data from the controller via the API. The API can be a first API, the instructions further including instructions to identify a second API in the vehicle to access a selection of the vehicle data not accessible via the first API.

The query can specify for the vehicle to obtain sensor data from at least one of a second vehicle and an infrastructure element. The query can request vehicle sensor data. The instructions can further include instructions to determine the query in part based on a location of the vehicle. The query can include one or more steps to determine whether a vehicle network has been hacked or spoofed.

The first message can be initiated upon user input specifying the event. The first message can include a vehicle location, and the query includes one or more steps to determine whether the vehicle location is accurate.

The instructions can further include instructions to identify the query at least in part based on output from a machine learning program. The instructions can further include instructions to identify the query based on a make and model of the vehicle.

Exemplary System

Figure 1:
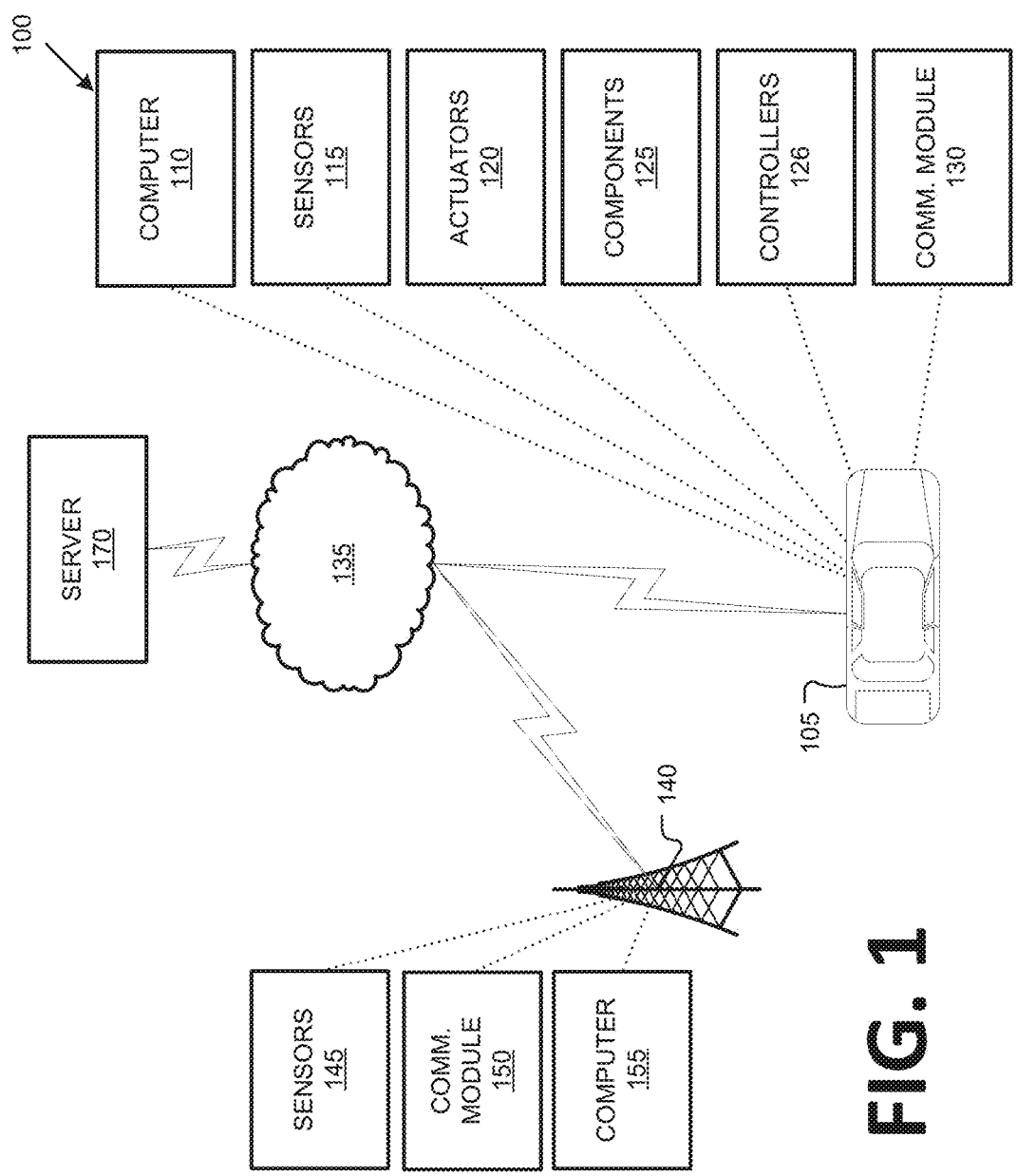
FIG. 1 is a block diagram illustrating an example system.

FIG. 1 is a block diagram of an example system 100 for dynamically managing detection and/or diagnosis of vehicle anomalies.

A vehicle 105, typically (but not necessarily) is a land vehicle such as a car, truck, etc. Additionally or alternatively, a vehicle 105 may include a bicycle, a motorcycle, etc. A vehicle 105 includes a vehicle computer 110, sensors 115, actuators 120 to actuate various vehicle components 125, and a vehicle communications module 130. The communications module 130 allows the vehicle computer 110 to communicate with one or more infrastructure elements 140 and a server 170, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

A vehicle computer 110 includes a processor and a memory such as are known. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 network such as a communications bus as described further below, more than one processor, e.g., included in electronic controller units (ECUs) or the like included in the vehicle for monitoring and/or controlling various vehicle components 125, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 105 network, the computer 110 may transmit messages to various devices in the vehicle and/or receive messages (e.g., CAN messages) from the various devices, e.g., sensors 115, an actuator 120, a human machine interface (HMI), etc. Alternatively or additionally, in cases where the computer 110 actually comprises a plurality of devices, the vehicle 105 communication network may be used for communications between devices represented as the computer 110 in this disclosure. Further, as mentioned below, various controllers and/or sensors 115 may provide data to the computer 110 via the vehicle communication network.

Vehicle 105 sensors 115 may include a variety of devices such as are known to provide data to the computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 101, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

One or more controllers 126 are typically provided in the vehicle 105 to monitor and/or control respective components 125. A controller 126 is a computing device that includes a processor and a memory, and is typically connected for wired or wireless communications via a vehicle communications bus or other vehicle 105 network. Controllers 126 can receive data from sensors 115 and/or can provide data via the vehicle 105 network, e.g., to the computer 110. Controllers 126 can also provide instructions or commands to actuators 120, thereby controlling components 120, e.g., controlling acceleration, braking, steering, etc. For example, an engine control module (ECM) is used to control and/or monitor an engine, a transmission control module (TCM) is used to control and/or monitor a transmission, brake control module (BCM) may be used to control the vehicle brakes, etc. Further, as controllers become more sophisticated, various functions may be combined or integrated into a single controller. For example, a powertrain control module (PCM) may be used to control the engine and transmission. Similarly, a vehicle control module (VCM) may be used to control the engine, transmission, active suspension, power steering, ABS, and the like.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications (cellular and/or DSRC, etc.) to another vehicle, to an infrastructure element 140 (typically via direct radio frequency communications) and/or (typically via the network 135) a remote server 170. The module 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 can include cellular, Bluetooth, IEEE 802.11, dedicated short range communications (DSRC), cellular V2X (CV2X), and the like.

The network 135 represents one or more mechanisms by which a vehicle computer 110 may communicate with an infrastructure element 140 and/or central server 170. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An infrastructure element 140 includes a physical structure such as a tower or other support structure (e.g., a pole, a box mountable to a bridge support, cell phone tower, road sign support, etc.) on or in which infrastructure sensors 145, as well as an infrastructure communications module 150 and computer 155 can be housed, mounted, stored, and/or contained, and powered, etc. One infrastructure element 140 is shown in FIG. 1 for ease of illustration, but the system 100 could and likely would include tens, hundreds, or thousands of elements 140.

An infrastructure element 140 is typically stationary, i.e., fixed to and not able to move from a specific physical location. The infrastructure sensors 145 may include one or more sensors such as described above for the vehicle 105 sensors 115, e.g., LIDAR, radar, cameras, ultrasonic sensors, etc. The infrastructure sensors 145 are fixed or stationary. That is, each sensor 145 is mounted to the infrastructure element so as to have a substantially unmoving and unchanging field of view.

Sensors 145 thus provide field of views in contrast to vehicle 105 sensors 115 in a number of advantageous respects. First, because sensors 145 have a substantially constant field of view, determinations of vehicle 105 and object locations can be accomplished with fewer and simpler processing resources than if movement of the sensors 145 also had to be accounted for. Further, the sensors 145 include an external perspective of the vehicle 105 and can sometimes detect features and characteristics of objects not in the vehicle 105 sensors 115 field(s) of view and/or can provide more accurate detection, e.g., with respect to vehicle 105 location and/or movement with respect to other objects. Yet further, sensors 145 can communicate with the element 140 computer 155 via a wired connection, whereas vehicles 105 typically can communicates with elements 140 and/or a server 170 only wirelessly, or only at very limited times when a wired connection is available. Wired communications are more reliable and can be faster than wireless communications such as vehicle-to-infrastructure communications or the like.

The communications module 150 and computer 155 typically have features in common with the vehicle computer 110 and vehicle communications module 130, and therefore will not be described further to avoid redundancy. Although not shown for ease of illustration, the infrastructure element 140 also includes a power source such as a battery, solar power cells, and/or a connection to a power grid.

Exemplary Operations

The computer 110 can include programming to send and receive messages. A "message" in the context of this disclosure is a set of data transmitted from a first computer to a second computer. As is known, computers, can be programmed to encode and serialize, i.e., convert to a string of bits, data, such as data describing objects, so that the data can be included in a message comprising packets that include the serialized data (or, in each of a plurality of packets, a portion thereof) as a payload, the message being transmitted to or from vehicle(s) and/or infrastructure(s), i.e., senders and receivers. A sender or a receiver can each be a computer, e.g., at a vehicle or infrastructure element (e.g., via a communications module). Further, the system can include a plurality of senders and/or a plurality of receivers. For example, as discussed further below, a receiver could receive a plurality of messages about an object from a respective senders.

Thus, a vehicle 105, i.e., via the computer 110, can send a message to a remote server 170, i.e., via the network 135. The message from the vehicle 105 can specify an event in the vehicle 10. An "event" in the present context, means that the computer 110 has identified an event code, fault code or diagnostic trouble code (DTC) or the like (generically referred to herein as an event code) from data provided from a controller 126 via the vehicle 105 network; specifying the event in this context means providing the event code. Example event codes, just to name a few, include a code specifying that a vehicle light is inoperative, a code indicating that a tire pressure is above or below a recommended range, a code indicating that an engine temperature is above a recommended range, a code indicating wear of a component 125 (e.g., brake pads), a code indicating that a fuel or power level is below a threshold for further operation, etc.

A vehicle 105 computer 110 could be programmed to send the message upon detecting the event and/or upon receiving user input specifying the event. For example, the computer 110 could be programmed to send a message upon identifying one or more events reported via a vehicle network such as CAN bus. Alternatively or additionally, a user could provide input, e.g., via a human machine interface in the vehicle such as a touchscreen, microphone, etc., specifying an event, e.g., a collision.

Further, the message typically includes identifying data for the vehicle 105 from which the message is sent, e.g., a vehicle identification number (VIN) or the like, and or a make, model, model year, and other information relevant to confirming an event, such as propulsion configuration (two wheel, all wheel, four wheel drive, size of internal combustion (IC) engine, whether the propulsion is hybrid electric/ IC, all IC, all electric, etc.). For example, as is known, a VIN can be decoded to identify a country of vehicle manufacture, a manufacturer, a make, model, model year, body style, engine type, transmission type, and/or other data.

A message from a vehicle 105 to a server 170 can additionally include vehicle 105 state data, i.e., data describing a state or condition of the vehicle 105, an environment around the vehicle 105, and/or one or more components 125 in the vehicle 105. Vehicle 105 state data can include data from one or more sensors 115, an identifier or identifiers for a component and/or controller 126 associated with or reporting an event, and/or other data concerning vehicle 105 operation and/or state. Examples of data from vehicle 105 sensors 115 and/or controllers 126 that could be provided include data specifying a state of charge (or charge level) of a vehicle 105 battery, a vehicle 105 location (e.g., according to geo-coordinates or the like a vehicle 105 speed, an ambient temperature (i.e., a temperature in an environment outside and around the vehicle 105), presence or absence of precipitation, whether an anti-lock brake system (ABS) was activated, etc.

Data from the vehicle 105 sensors 115 and/or controllers 126 can be compared to one or more trigger parameters stored in the server 170. A trigger parameter is a value or range of values that, if matched by data reported in a message from a vehicle 105 along with a specified event code, can trigger the server 170 to query the vehicle 105, i.e., to provide a query via a controller 126 API, for further data relevant to the event code. Various examples of trigger parameters are described herein. For example, the server 170 could determine, e.g., by consulting a lookup table of the like, that a value measured by a sensor 115 and/or controller 126, e.g., an invalid timestamp for a message via the vehicle 105 communication bus, an invalid odometer reading (e.g., a reading less than a prior reading), an unreasonable GPS location (e.g., more than a distance from a prior location that the vehicle 105 could reasonably have traveled), etc. In another example, the server 170 could determine a trigger parameter possibly indicated that a vehicle 105 network has been hacked and/or vehicle 105 data is being spoofed, e.g., where an event code is unknown or specifies an unknown diagnostic state, where data fluctuates outside of a range specified as typical, etc. In another example, the server 170 could determine that an event code is associated with a measured value in the vehicle relating to a regulation and/or monitoring, e.g., vehicle emissions, driver distraction (e.g., amount of time driver's gaze can leave road, amount of time driver's hands can be off steering wheel, etc.). In another example, an event code indicating replacement of parts or components (e.g., replacement of a controller 126, a new key fob, etc.), could be a trigger parameter. In yet another example, a trigger parameter could be specified by user input, e.g., by a technician seeking to diagnose a user-reported service issue, e.g., vehicle reported to be stalling or unable to achieve a certain speed could be the basis for a technician inputting a trigger parameter to receive additional diagnostic information from an engine control module (ECM) controller 126 and/or from a fuel system controller 126 to provide data about a percentage of water in fuel, etc. Another example of user input specifying a trigger parameter could be to determine a presence or absence of a capability or functionality in a controller 126, e.g., whether an ECM controller 126 can provide certain data. Another example of user input specifying a trigger parameter could be to determine accuracy of data received from the vehicle 105 and displayed on a user device, e.g., low fuel level, fuel economy, GPS location, tire pressure, remaining oil life, electric vehicle charging state and charging power, etc.

The server 170 can be programmed to, after the message specifying the event is received, identify vehicle data to confirm or disprove the event in the vehicle, and then identify an application programming interface (API) in the vehicle to access at least some of the vehicle data. For example, the API can be identified based on identifying a controller 126 in the vehicle 105 providing data indicating the event, and a query directed to the controller 126 according to the API could request at least some of the vehicle 105 data from the controller 126 via the API.

That is, the server 170 can be programmed to identify a datum or data, that, if having a specified value, or within a specified range of values (i.e., above/and/or below threshold (s)), confirms or disproves the existence of the event specified in the message from the vehicle 105 computer 110. For example, the server 170 (or an included or connected data store) could store a table or other data record that specifies, for a specific vehicle make, model, model year, and engine type, and for a specific event code that the vehicle could provide, a vehicle datum or data to confirm or disprove the validity of the event (e.g., that a reported fault likely does or does not exist). The server 170 could further store an identifier for a controller 126 that can be queried for the vehicle data to confirm or disprove the validity of the event, as well as a query via an API provided by the controller 126 to obtain the datum or data. For example, the server 170 could store a table as follows:

when the battery was last fully charged and other data relevant to determining battery charge, including, e.g., a distance traveled since the last full charge, ambient temperature, operation of climate control, etc.

Yet further for example, the query can specify for the vehicle 105 to obtain sensor data from at least one of a second vehicle and/or an infrastructure element 140. A vehicle 105 can, for example, be capable of V2X or V2V communications as described above, and could thereby request data from another vehicle and/or an infrastructure element 140. For example, other vehicle sensors 115 and/or infrastructure sensors 145 could have the host vehicle 105 within their field of view. Such sensors 115, 145 could provide data to confirm or disprove an event, e.g., images of a vehicle 105 to show whether a tire was flat a window was open or shattered or cracked, etc. A host vehicle 105 could provide image data or other sensor 115, 145 data to the server 170 in response to a query.

The server 170 further can be programmed to, upon identifying a query based on the vehicle identifier and event code, and possibly also based on one or more trigger parameters, transmit to the vehicle a second message including a query for the vehicle data according to the API.

The server 170 can further be programmed to then receive vehicle data in response to the query and confirm or disprove the event in the vehicle based on the vehicle data. To confirm an event means to determine that one or more data retrieved from a vehicle 170 in response to a report of an event have values that have been determined to mean that the event

| Field | Explanation |
|---|---|
| Vehicle identifier | Combination of one or more identifying characteristics to identify the vehicle sufficiently to interpret an event code, e.g., make, model, model year, engine type, body style, transmission type, etc. |
| Event code | An event code for the vehicle identified by the vehicle identifier (e.g., a fault code, DTC, or the like). |
| Trigger parameter(s) | One or more values or range of values in data provided from a vehicle 105 to trigger a query to the vehicle based on the event code. |
| Query | Data to be requested from the vehicle 105 based on the vehicle identifier and event code, including a controller 126 to be queried and a function call or calls or the like to an API provided by the controller 126 to return the requested data. |

The query can request data from the vehicle 105. A query can request data including a CAN signal based on what is known as a data identifier (or "DID"). Specific data identifiers for can signals available on the CAN bus of a specific vehicle 105 can be determined from the VIN for the vehicle 105, e.g., by a lookup table or the like that stores specific CAN signals, and program code to retrieve the CAN signal (s) from a vehicle 105 and or specific API of a controller 126, for a vehicle 105, make, model, model year, etc. Thus, a requisite prior condition to sending a query to a vehicle 105 typically includes determining that the vehicle 105, e.g., one or more controllers 126 on the vehicle 105, provide the request data, e.g., a specified CAN signal, via the vehicle 105 communication bus.

A query could, for example, request that a vehicle 105 provide sensor 115 data, e.g., an interior camera could provide data to show whether a vehicle light was activated, an exterior camera could show whether a vehicle 105 had collided with another object, etc. In another example, where the message from the vehicle 105 to the server 170 specified a vehicle state of charge and/or reported a low charge event, the query could request that the vehicle 105, e.g., via an API of a power controller 126, confirm an amount of charge in vehicle 105 battery components 125 and/or provide a time occurred. To disprove an event means to determine that one or more data retrieved from a vehicle 170 in response to a report of an event have values that have been determined to mean that the event did not occur.

For example, the server 170 could store (or have access to a data store that stores) a lookup table or the like specifying, for an event that could be reported from a vehicle 105, a set of one or more data, e.g., one or more CAN signals, to be requested from the vehicle 105 reporting the event. The server 170 could (and likely would) store such data for each of a plurality of events that a vehicle 105, e.g., according to a VIN or the like, could report, along with the associated data to be queried from the vehicle 105 upon report of the event. For example, a reported event could be GPS location that is more than a specified distance from a prior reported location within a specified period of time. The server 170 could store a set of CAN signals to then be queried from the vehicle 105, e.g., via a controller 126 In another example, an event could be report of data spoofing or hacking. For example, a vehicle 105 computer 110 could be programmed to report a hacking event upon determining that a vehicle 105 odometer value has decreased, or that sensor 115 values are changing erratically (e.g., a camera or radar becomes unaligned or changes direction). Upon receiving a report of such hacking event, the server 170 could query the vehicle 105 for CAN signal data, e.g., specifying whether a dealer tool capable of altering the odometer and/or sensor 115 value was connected to the vehicle, whether a CAN signal includes an odometer and/or sensor 115 reset value, etc.

The server 170 could further be programmed then to confirm or disprove an event based on data provided in response to such query. For example, the server could be provided with rules for evaluating data values to confirm or disprove an event. Continuing an above example, assume that a vehicle location is an event. The server 170 could be programmed to confirm the event if all of a distance from a prior location, a velocity of the vehicle, and an elapsed time from a prior reading have respective values in a range for which the server 170 is programmed to confirm the event (or in a range stored in a table or the like retrieved by the server 170). On the other hand, if only some but not all of the queried data is consistent with the event, the server 170 could be programmed to disprove the event. In yet other examples, the server 170 could be programmed to confirm or disprove an event based on some but not all queried data values being consistent with the event, e.g., machine learning or the like could be used to train a set of data matching confirmation or disproval of an event.

The server 170 could further alternatively or additionally be programmed to determine that an event cannot be confirmed or disproved, and/or to query the vehicle 105 for further data to determine whether the event can be confirmed or disproved. For example, The server 170 can be programmed to confirm or disprove an event in a vehicle 105 based on environmental data retrieved from a data source external to the vehicle in addition to the vehicle data received from the vehicle 105. For example, the data source external to the vehicle 105 can be a stationary infrastructure element 140 proximate to the vehicle 105. An infrastructure element 140 is proximate to a vehicle 105 when it is within a specified distance (e.g., geo-coordinates for a vehicle 105 are within a specified radius, e.g., one kilometer, of geo-coordinates for an infrastructure element 140) of the vehicle 105 and/or has the vehicle 105 within sensor 145 field(s) of view and/or has established vehicle-to-infrastructure communications with the vehicle 105. Environmental data can be based on infrastructure element 140 sensor 145 data and/or data from a vehicle 105 as described above.

The server 170 can alternatively or additionally be programmed to determine a query and/or confirm or disprove an event in a vehicle 105 based on a vehicle 105 location. As noted above, the first message can include a vehicle location. In one example, the query can include a request for data to determine whether the report vehicle location is accurate.

The server 170 can be further programmed to specify an action for the vehicle based on confirming or disproving the event in the vehicle. The server 170 could store a table or the like specifying, for a vehicle 105 identified as described above, and for a confirmed event, an action to specify for the vehicle 105 computer 110 to take, e.g., to actuate a component or components 125 to navigate the vehicle 105 to a specified location, halt the vehicle 105, etc. For example, a confirmed event could be a low tire pressure, whereupon the sever 170 could be programmed to instruct the vehicle 105 to navigate to a specified location such as a location of a service facility and/or to move to a side of a road or other safe parking location for service. On the other hand, the server 170 could be programmed, upon determining a disproved event, to instruct the vehicle 105 to disregard the event and to continue operations as if the event were not reported. In another example, an action could include limiting or disabling an operation of a vehicle component. For example, upon determining that a low vehicle tire pressure is confirmed, the server 170 could instruct the vehicle computer 110 to limit the vehicle 105 speed, e.g., to 40 kilometers per hour or some other speed that could be varied based on a percentage by which the tire pressure was below a range specified for normal operation.

Alternatively or additionally, a vehicle computer 110 could be programmed, e.g., as described above, to specify an action for upon a vehicle 105 receiving notification form the server 170 that an event in the vehicle 105 is confirmed or disproved.

In addition to identifying one API in the vehicle 105 to be queried, as described above, the server 170 could be programmed to identify at least one second API. Typically, the reason for identifying the second API is to obtain data that is not available via the first API, but that is useful for confirming or disproving the event in a message from a vehicle 105. For example, the server 170 could be programmed, based on a specified event, to include in a query subqueries for respective vehicle 105 controllers 126, each having their own respective APIs. Accordingly, the server 170 could store in a table or the like such as described above, a plurality of subqueries for respective controllers 126 to be provided upon a message from a vehicle 105 specifying a given event.

Figure 2:
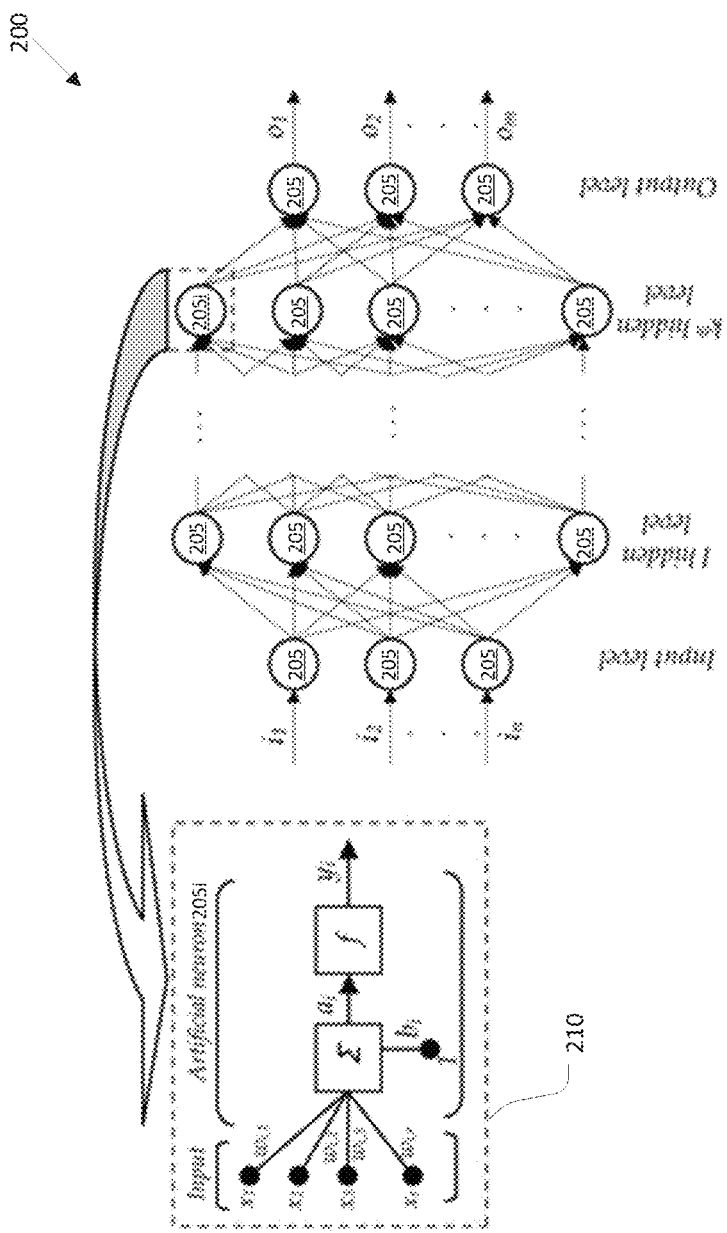
FIG. 2 is a diagram of an example deep neural network (DNN).

In one example, the server 170 could be programmed to determine the query at least in part based on output from a machine learning program. FIG. 2 is a diagram of an example deep neural network (DNN) 200 that could be trained to at least partly determine a query. The DNN 200 can be a software program that can be loaded in memory and executed by a processor included in a server 170, for example. The DNN 200 can include n input nodes 205, each accepting a set of inputs i (i.e., each set of inputs i can include on or more inputs x). The DNN 200 can include m output nodes (where m and n may be, but typically are not, a same number) provide sets of outputs $o_1 \ldots o_m$. The DNN 200 includes a plurality of layers, including a number k of hidden layers, each layer including one or more nodes 205. The nodes 205 are sometimes referred to as artificial neurons 205, because they are designed to emulate biological, e.g., human, neurons. The neuron block 210 illustrates inputs to and processing in an example artificial neuron 205i. A set of inputs $x_1 \ldots x_r$ to each neuron 205 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 205i output $y_i$. The activation function $f$ can be a variety of suitable functions, typically selected based on empirical analysis. As illustrated by the arrows in FIG. 2, neuron 205 outputs can then be provided for inclusion in a set of inputs to one or more neurons 205 in a next layer.

The DNN 200 can be trained to accept as input data, e.g., data specifying an event in a vehicle 105 and/or other data such as sensor 115 data from the vehicle 105, and to output one or more parameters for a query to the vehicle 105. For example, the DNN 200 could be trained to output a specification of a controller 126 and/or controller 126 API (or multiple controllers 126 and/or APIs) to be queried, and/or to output specific data to be requested from a controller 126. For example, various data values in a vehicle 105 may be consistent or inconsistent with an event such as tampering with an odometer or other spoofing or hacking. Some of these may be intuitively understood, e.g., sudden deceleration of a vehicle 105, whereas many other data values may not be understood to correlate to, and may or may not correlate to, the event. A DNN 200 could be trained to identify such other data values.

That is, the DNN 200 can be trained with ground truth data, i.e., data about a real-world condition or state. Weights w can be initialized by using a Gaussian distribution, for example, and a bias b for each node 205 can be set to zero. Training the DNN 200 can including updating weights and biases via conventional techniques such as back-propagation with optimizations. Example initial and final (i.e., after training) parameters (parameters in this context being weights w and bias b) for a node 205 in one example were as follows:

| Parameters | Initial value | Final value |
|---|---|---|
| $w_1$ | 0.902 | −0149438 |
| $w_2$ | −0.446 | −0.0103792 |
| $w_3$ | 1.152 | 0.00850074 |
| $w_r$ | 0.649 | 0.00349599 |
| $b_i$ | 0 | 0.00241366 |

A set of weights w for a node 205 together are a weight vector for the node 205. Weight vectors for respective nodes 205 in a same layer of the DNN 200 can be combined to form a weight matrix for the layer. Bias values b for respective nodes 205 in a same layer of the DNN 200 can be combined to form a bias vector for the layer. The weight matrix for each layer and bias vector for each layer can then be used in the trained DNN 200.

In the present context, the ground truth data used to train the DNN 200 could include data available on a vehicle 105 network and/or from vehicle 105 controllers 126 at a time of and/or near an event. For example, data could be gathered various sensors 115 at a time of and/or near a flat tire event, e.g., from accelerometers mounted to vehicle 105 suspension parts, e.g., spindle, shock tower, from a steering controller 126 specifying a steering wheel angle, from an engine controller 126 specifying an engine speed, engine torque, etc. from a transmission controller 126 specifying a state of a vehicle 105 transmission, etc. the data 115 can then be labeled for training the DNN 200, i.e., tags can be specified identifying the event and various data, such as just described, reported at a time of the event the DNN 200 can then be trained to output data values that correlate to the event, and a query to a vehicle 105 can then be specified to obtain such data values to assist in confirming or disproving the event as reported in a vehicle 105 message to the server 170.

The server 170 could also be programmed to use a machine learning program such as a DNN 200 to confirm or disprove an event. For example, similar to the training of a DNN 200 above to determine at least part of a query, a DNN 200 could be trained based on ground truth data specifying that an event has occurred, to recognize data values in a vehicle 105, e.g., returned in response to a query, indicating that an event occurred or did not occur, i.e., is confirmed or disproved.

In another example, a query can include one or more steps to determine whether a vehicle network has been hacked or spoofed. An event could be specified in a vehicle 105 message where the message is spoofed, i.e., is represented as being from the vehicle 105 but in fact is not. Likewise, an event could be specified in a vehicle 105 message where the message or the computer 110 sending the message has been hacked, i.e., an intruder has gained control of the computer 110 to cause it to provide inaccurate and/or incomplete data. To determine whether the message is hacked or spoofed, the server 170 could be programmed to respond with a query to the vehicle 105 requesting verification of the message, e.g., including a private key for authentication. Alternatively or additionally, the server 170 could be programmed to include in the query a request that the vehicle 105 reconfirm the event.

Processes

Figure 3:
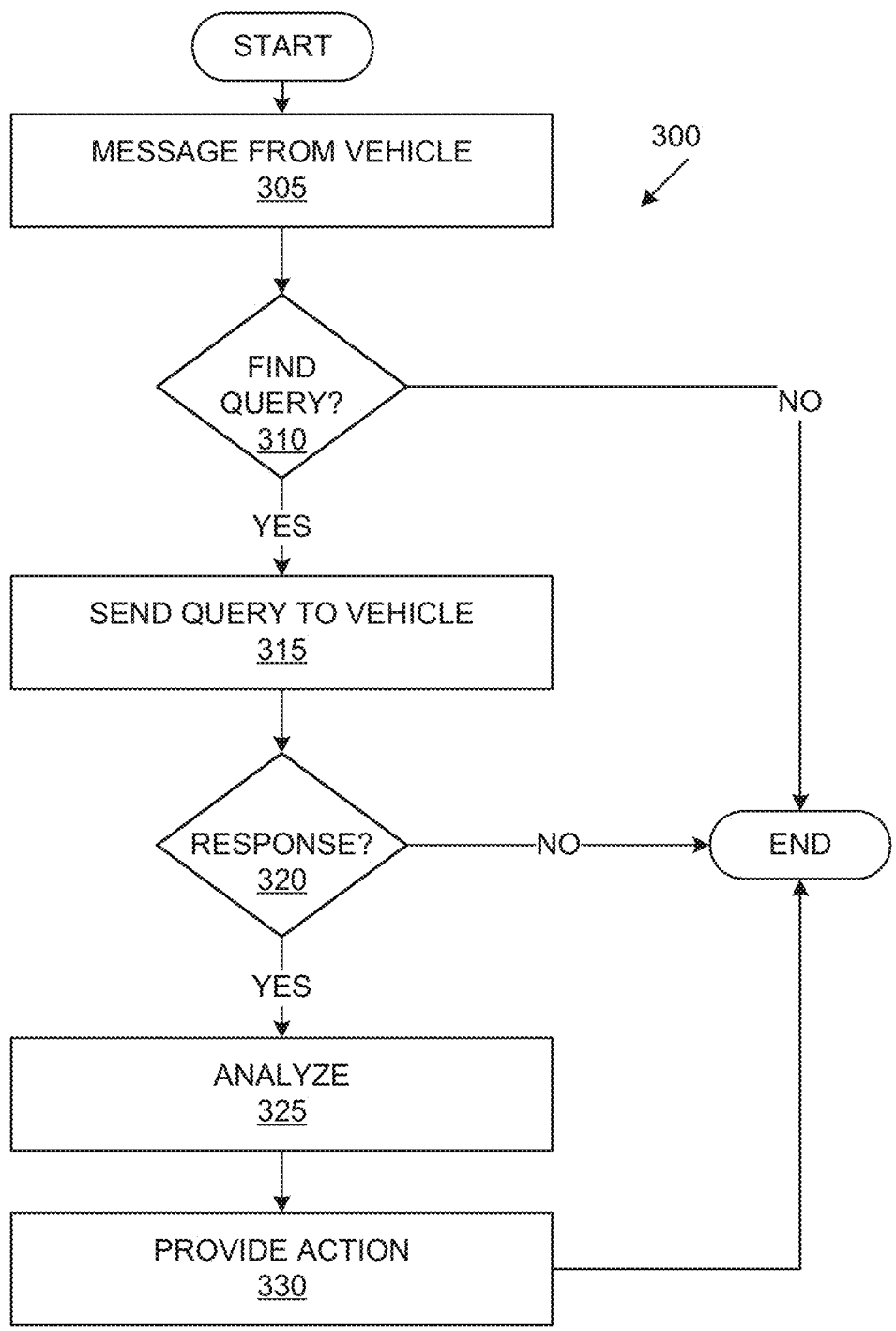
FIG. 3 is a flowchart of an exemplary process for a server to process a message from a vehicle.

FIG. 3 is a flowchart of an exemplary process 300 for a server 170 to process a message from a vehicle 105. The process 300 begins in a block 305 in which the server 170 receives a message from a vehicle 105 specifying an event, typically via a network 135 as described above.

Then, in a decision block 310, the server 170 determines whether it can locate or generate a query to the vehicle 105 in response to the event. If not, the process 300 ends following the block 310. Otherwise, the process 300 proceeds to a block 315.

In the block 315, the query, e.g., a set of instructions and/or request for data as described above, e.g., for one or more APIs of one or more vehicle 105 controllers 126, is sent to the vehicle 105, e.g., a computer 110, typically via a network 135 as described above.

Next, in a decision block 320, the server 170 determines whether it has received a response from the vehicle 105 to the query sent in the block 315. Typically, the server 170 is programmed to determine that it has not received a response from the vehicle 105 if a response is not received within a specified timeout period, e.g. 15 seconds, 30 seconds, one minute, etc. If the response is not received, the process 300 may end following the block 320. Otherwise, the process 300 can proceed to a block 325.

In the block 325, the server 170 executes programming such as described above to analyze the response to the query received from the vehicle 105. That is, the server 170 predicts whether the event specified in the message received in the block 305 is confirmed or disproved.

Next, in a block 330, the server 170 determines and transmits to the vehicle 105 an action in response to the determination in the block 325 that the event is confirmed or disproved. In this context, an "action" includes actuation of one or more vehicle 105 components 125. For example, the action could include moving the vehicle 105 two a specified location because the event has been confirmed, e.g., moving the vehicle 105 two a roadside or safe parking area because a low tire pressure event is confirmed. In one example, an action could include disabling or preventing actuation of one or more vehicle 105 components, e.g., powering a vehicle 105 off, halting vehicle 105 movement, etc., e.g., because a potentially disabling event is confirmed. In yet another example, where an event is disproved, the action could include operating the vehicle 105 based on the event not having occurred, e.g., based on tire pressure being within a normal range, etc.

Following the block 330, the process 300 ends.

Figure 4:
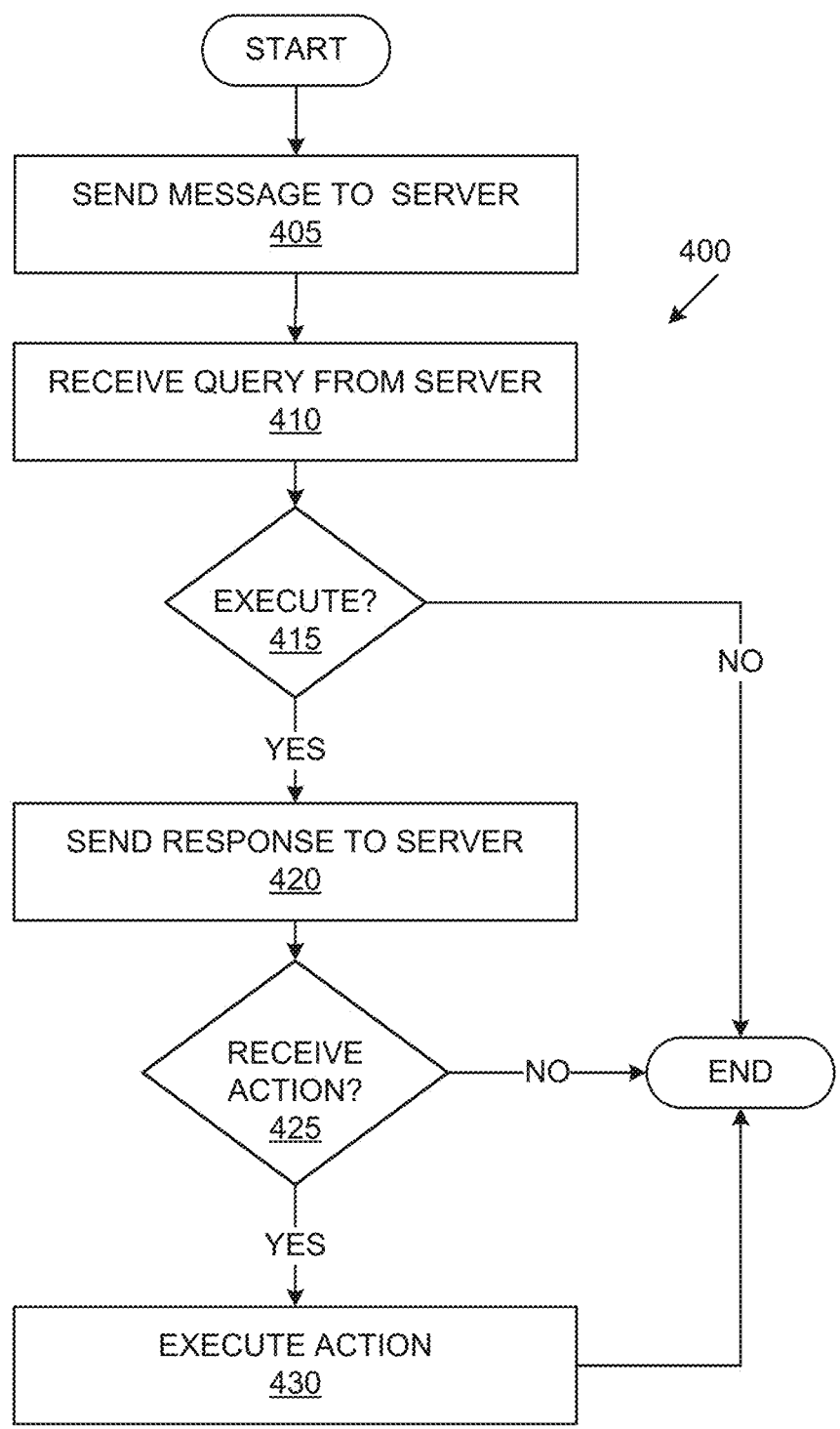
FIG. 4 is a flowchart of an exemplary process for a vehicle computer to report an event to, and process a query from, a server.

FIG. 4 is a flowchart of an exemplary process 400 for a vehicle 105 computer 110 to report an event to, and process a query from, a server 170. The process 400 begins in a block 405, in which the computer 110 sends a message, e.g., via the network 135, to the server 170 reporting an event, e.g., based on a trigger parameter such as described above.

Next, in a block 410, the computer 110 receives a query from the server 170 in response to the message of the block 405.

Next, in a block 415, the computer 110 attempts to execute the query. If it is unsuccessful, e.g., because the query specifies a request for a controller 126 not present in the vehicle 105, because the specified controller 126 does not respond to the query, etc., then the process 400 ends following the block 415. Otherwise, the process 400 proceeds to a block 420.

In the block 420, the computer 110 sends, e.g., via the network 135, the response to the query to the server 170.

Next, in a decision block 425, the computer 110 determines whether a response has been received from the server 170, e.g., within a specified timeout period, e.g., 10 seconds, 30 seconds, 60 seconds, etc. If no further response has been received from the server 170, then the process 400 ends following the block 425. Otherwise, the process 400 proceeds to a block 430.

In the block 430, the computer 110 determines whether an action has been specified by the server 170, and if so, executes the action. For example, as described above, the computer 110 could instruct actuators 120 to actuate one or more components 125 and/or actuation of one or more components 125 could be disabled or prevented. Following the block 430, the process 400 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

"Based on" encompasses "based wholly or partly on." If, herein, a first thing is described and/or claimed as being "based on" the second thing, then the first thing is derived or calculated from the second thing, and/or output from an algorithm, process, or program function that accepts some or all of the second thing as input and outputs some or all of the first thing.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   receive a first message from a vehicle specifying an event in the vehicle;
   identify vehicle data to confirm or disprove the event in the vehicle;
   identify a first application programming interface (API) that is one of a plurality of available APIs in the vehicle to access at least some of the vehicle data to confirm or disprove the event in the vehicle; and
   transmit to the vehicle a second message including a query according to the first API for the vehicle data to confirm or disprove the event in the vehicle.

2. The system of claim 1, the instructions further including instructions to receive the vehicle data in response to the query and confirm or disprove the event in the vehicle based on the vehicle data.

3. The system of claim 2, the instructions further including instructions to confirm or disprove the event in the vehicle based on environmental data retrieved from a data source external to the vehicle.

4. The system of claim 3, wherein the data source external to the vehicle is a stationary infrastructure element, and the environmental data is based on infrastructure element sensor data.

5. The system of claim 2, the instructions further including instructions to specify an action for the vehicle based on confirming or disproving the event in the vehicle.

6. The system of claim 5, wherein the action includes navigating the vehicle to a specified location.

7. The system of claim 5, wherein the action includes disabling an operation of a vehicle component.

8. The system of claim 1, wherein the first message includes vehicle sensor data.

9. The system of claim 1, wherein the first message specifies a controller in the vehicle that is subject to the event in the vehicle.

10. The system of claim 1, wherein the first API is identified based on identifying a controller in the vehicle providing data indicating the event in the vehicle, and the query requests at least some of the vehicle data from the controller via the first API.

11. The system of claim 1, wherein the query specifies for the vehicle to obtain sensor data from at least one of a second vehicle and an infrastructure element.

12. The system of claim 1, wherein the query requests vehicle sensor data.

13. The system of claim 1, wherein the first message is initiated upon user input specifying the event in the vehicle.

14. The system of claim 1, the instructions further including instructions to determine the query in part based on a location of the vehicle.

15. The system of claim 1, wherein the first message includes a vehicle location, and the query includes one or more steps to determine whether the vehicle location is accurate.

16. The system of claim 1, the instructions further including instructions to identify a second API in the vehicle to access a selection of the vehicle data not accessible via the first API.

17. The system of claim 1, wherein the first message includes a vehicle state of charge, the instructions further including instructions to identify the first API and determine the query based at least in part on the vehicle state of charge.

18. The system of claim 1, the instructions further including instructions to identify the query at least in part based on output from a machine learning program.

19. The system of claim 1, the instructions further including instructions to identify the query based on a make and model of the vehicle.

20. The system of claim 1, wherein the query includes one or more steps to determine whether a vehicle network has been hacked or spoofed.

* * * * *